United States Patent [19]

Endo et al.

[11] Patent Number: 5,173,532
[45] Date of Patent: Dec. 22, 1992

[54] ANTI-FRICTION AND WEAR-RESISTANT POLYACETAL MOLDING COMPOSITIONS, AND MOLDED SLIDING MEMBERS FORMED THEREOF

[75] Inventors: Toshihiko Endo; Osamu Kanoto; Katsunori Takayama; Nobuyuki Matsunaga, all of Shizuoka, Japan

[73] Assignee: Polyplastics Co., Ltd., Osaka, Japan

[21] Appl. No.: 847,885

[22] Filed: Mar. 10, 1992

Related U.S. Application Data

[63] Continuation of Ser. No. 587,951, Sep. 25, 1990, abandoned.

[30] Foreign Application Priority Data

Sep. 25, 1989 [JP] Japan ................................ 1-248809

[51] Int. Cl.⁵ .................................................. C08K 3/26
[52] U.S. Cl. ..................................... 524/425; 524/445; 524/447; 524/449; 524/451; 524/493; 524/504; 524/512; 524/542
[58] Field of Search ............... 524/425, 445, 447, 449, 524/451, 493, 504, 512, 542

[56] References Cited

U.S. PATENT DOCUMENTS

| 2,940,947 | 6/1960 | Welch et al. ............... 524/269 X |
| 3,214,291 | 10/1965 | Dixler ............................. 524/269 X |
| 3,629,177 | 12/1971 | Hoffmann ...................... 524/161 |
| 4,020,217 | 4/1977 | Karasudani et al. .......... 524/269 X |
| 4,225,456 | 9/1980 | Schmidt et al. ............... 524/269 X |
| 4,383,057 | 5/1983 | Yamamoto et al. ........... 524/503 X |
| 4,390,656 | 6/1983 | Weise et al. ................... 524/503 X |
| 4,596,847 | 6/1986 | Kasuga et al. ................ 524/220 |
| 4,600,735 | 7/1986 | Larsson et al. ............... 524/503 X |
| 4,661,549 | 4/1987 | Walker .......................... 524/397 |
| 4,678,828 | 7/1987 | Nakamura et al. ............ 524/269 X |
| 4,833,187 | 5/1989 | Sittenthaler et al. .......... 524/268 X |
| 4,873,282 | 10/1989 | Yui et al. ....................... 524/496 |
| 4,879,331 | 11/1989 | Endo et al. .................... 524/267 |
| 5,037,871 | 8/1991 | Jones ............................. 524/269 X |
| 5,039,741 | 8/1991 | Burg et al. ..................... 525/66 |

FOREIGN PATENT DOCUMENTS

| 0124879 | 11/1984 | European Pat. Off. . |
| 0156285 | 10/1985 | European Pat. Off. . |
| 0340931 | 11/1989 | European Pat. Off. . |
| 0354802 | 2/1990 | European Pat. Off. . |
| 0275357 | 12/1986 | Japan .................................. 524/269 |
| 0197809 | 9/1978 | Netherlands ....................... 524/269 |
| 0927517 | 5/1963 | United Kingdom ............... 524/269 |

Primary Examiner—Paul R. Michl
Assistant Examiner—Edward Cain
Attorney, Agent, or Firm—Nixon & Vanderhye

[57] ABSTRACT

Polyacetal resin molding compositions and sliding members formed thereof exhibit anti-friction and abrasion-resistance properties. The polyacetal resin molding compositions include (A) 100 parts by weight of a polyacetal base resin, (B) between 0.5 to 40 parts by weight of a branched or cross-linked graft copolymer which is a graft-reaction product of (a) an olefin polymer, and (b) a vinyl or ether polymer, (C) between 0.1 to 20 parts by weight of a lubricant, and (D) between 0.5 to 30 parts by weight of an inorganic powder having a mean particle diameter of 50 μm or less and a content of particles having a particle diameter of 100 μm or less of at least 95%.

6 Claims, 1 Drawing Sheet

Fig. 1A
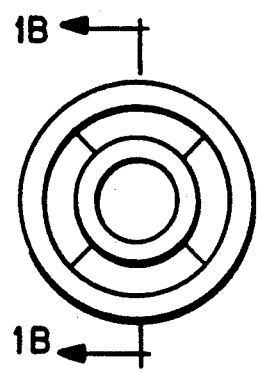
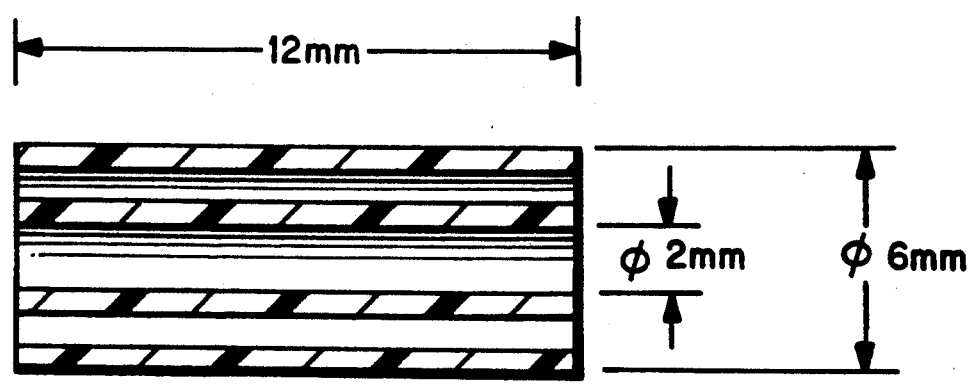
Fig. 1B

ANTI-FRICTION AND WEAR-RESISTANT POLYACETAL MOLDING COMPOSITIONS, AND MOLDED SLIDING MEMBERS FORMED THEREOF

This is a continuation of application Ser. No. 07/587,951, filed Sep. 25, 1990, now abandoned.

FIELD OF INVENTION

The present invention generally relates to polyacetal molding compositions having anti-friction and wear-resistant properties, and to molded sliding members (e.g., wear parts) formed of the same.

BACKGROUND AND SUMMARY OF THE INVENTION

Polyacetal resins are well known engineering resins due to their balanced mechanical properties. In this regard, polyacetal resins usually exhibit desirable physical properties in terms of their frictional abrasive characteristics, electrical properties and chemical and heat resistance properties. As a result, polyacetal resins are being used extensively as a material from which parts for automobiles, electrical and electronic devices and the like are made. The properties that are, however, required of polyacetal resins in such end-use applications are continually in need of improvement due to the special environments of use.

The sliding characteristics of polyacetal resins are examples of properties which sometimes need improvement. In this regard, the sliding characteristics of polyacetal resin involve not only its anti-friction characteristics (as determined by coefficients of friction) and abrasion-resistance properties, but also anti-frictional noise (i.e. squeaking) characteristics. All such properties are important when polyacetal resins are used as sliding members—that is, a component or part having a surface which bears against a surface of another component or part. It can be appreciated, therefore, that all such characteristics—that is, anti-friction and anti-frictional noise characteristics, in addition to abrasion resistance—are important when polyacetal resins are employed as wear parts.

Several techniques have been employed in the past to improve the sliding characteristics of polyacetal resins. For example, it has been suggested that other resins, such as fluororesins or polyolefin resins, or lubricating oils, such as fatty acids, fatty acid esters, silicone oils or mineral oils may be added to polyacetal base resins to improve the sliding characteristics thereof. Some improvements, for example, improvements in anti-frictional noise characteristics, are obtained by adding fluororesins or polyolefin resins to a polyacetal base resin. However, these resins typically exhibit poor compatability with the polyacetal base resin and therefore tend to delaminate on the surface of molded articles formed from such resin compositions. In addition, the poor compatability of the resins in the composition may form mold deposits during injection molding of a part formed thereof.

Similarly, the addition of lubricating oils is typically effective to reduce coefficients of friction and improve abrasion resistance of molded articles. However, the addition of lubricating oils is usually inadequate to improve the anti-frictional noise characteristics of the wear part. Several other problems also exist when lubricating oils are added to polyacetal resins, such as extrusion difficulties and "bleeding" of the lubricating oil onto the surface of molded parts during use.

Thus, although some improvements have been achieved by means of the prior art techniques described above, further improvements in terms of anti-friction, anti-frictional noise and abrasion-resistance characteristics for sliding members, while maintaining and/or balancing the otherwise desirable mechanical/physical properties of polyacetal resins, have been needed.

Broadly, the present invention relates to polyacetal resin molding compositions and molded parts therefrom that exhibit well balanced anti-friction, anti-frictional noise and abrasion-resistance characteristics, moldability, little (if any) delamination problems, satisfactory surface hardness and machinability. The compositions of the present invention are obtained by blending a specific graft copolymer, a lubricant and an inorganic powder having specific particle size limitations with a polyacetal base resin.

More specifically, the present invention is embodied in polyacetal resin molding compositions which include 100 parts by weight of a polyacetal base resin, between 0.5 to 40 parts by weight of a branched or cross-linked graft copolymer which is the graft-reaction product of (a) an olefin polymer, and (b) a vinyl or ether polymer, between 0.1 to 20 parts by weight of a lubricant, and between 0.5 to 30 parts by weight of an inorganic powder having a mean particle diameter of 50 $\mu$m or less, and wherein at least 95% of the particles have a particle diameter of 100 $\mu$m or less of at least 95%.

Further aspects and advantages of the present invention will become more clear after careful consideration is given to the detailed description of the preferred exemplary embodiments thereof which follow.

BRIEF DESCRIPTION OF THE ACCOMPANYING DRAWINGS

Reference will hereinafter be made to the accompanying drawings wherein:

FIG. 1A is an end view of a guide roller used to evaluate the machinability of molded articles of the present invention according to the Examples below; and FIG. 1B is a side elevational view of the guide roller depicted in FIG. 1A.

DETAILED DESCRIPTION OF PREFERRED EXEMPLARY EMBODIMENTS

The polyacetal base resin which can be used in the compositions of the present invention includes both polyacetal homopolymers and polyacetal copolymers having a polymer backbone mainly comprised of repeating oxymethylene units. In addition, resins prepared by modifying polyacetal by cross-linking or grafting by well-known techniques can be used as the base resins. The degree of polymerization for the polyacetal base resin is not particularly limited provided that the moldability of the resin is not affected.

The graft copolymer component that may be used in the compositions of the present invention includes copolymers formed by the graft-polymerization of (a) an olefin polymer, and (b) a vinyl and/or ether polymer so as to form a branched or cross-linked structure.

Examples of the olefin polymer include homopolymers such as polyethylene, polypropylene and polybutene and copolymers having such homopolymers as the principal components. Examples of olefin copolymers onto which the vinyl and/or ether polymer may be grafted include ethylene/propylene copolymers, ethylene/1-butene copolymers and copolymers comprising ethylene and a glycidyl ester of an α,β-unsaturated acid (for example, glycidyl acrylate, glycidyl methacrylate and glycidyl ethacrylate). Among them, polyethylene and copolymers comprising ethylene and glycidyl ester of an α,β-unsaturated acid (especially, ethylene/glycidyl methacrylate) are most preferred.

The polymer grafted onto the olefin polymer backbone comprises at least one polymer selected from the vinyl and ether polymers mentioned below. Examples of vinyl polymers include polymethyl methacrylate, polyethyl acrylate, polybutyl acrylate, poly-2-ethylhexyl acrylate, polystyrene, polyacrylonitrile, acrylonitrile/styrene copolymers, butyl acrylate/methyl methacrylate copolymer and butyl acrylate/styrene copolymers. Examples of ether polymers include polyethylene oxide, polytrimethylene oxide and polypropylene oxide. Preferred examples are polymethyl methacrylate, acrylonitrile/styrene copolymers, and polyethylene oxide. A graft copolymer prepared by grafting polymethyl methacrylate or an acrylonitrile/styrene copolymer onto polyethylene is particularly preferred.

The graft copolymer component used in the compositions of this invention is thus especially characterized by an olefin polymer backbone, and a vinyl polymer or ether polymer grafted thereto. Thus, the vinyl and ether polymers are not used separately of the olefin polymer, but instead are grafted onto the olefin backbone through at least one site to form a branched or cross-linked polymeric structure. The effects achieved by the graft copolymer cannot be attained by merely adding either, or both, of the copolymer components to the polyacetal base resin.

The graft copolymer that may be employed in the compositions of this invention can most easily be prepared by well-known radical reaction techniques. For example, the graft copolymer may be prepared by adding a radical catalyst to monomers constituting the polymer components and then performing grafting by kneading the monomer components. Alternately, a radical catalyst, such as a peroxide, may be added to one of the polymers to form free radicals, followed by melt-kneading the mixture with the other component polymer. The ratio of the olefin polymer component to the vinyl and/or ether polymer component grafted thereto so as to form the graft copolymer is preferably between 95:5 to 5:95, desirably between 80:20 to 20:80, and more desirably, between 60:40 to 40:60.

The amount of the graft copolymer component is most preferably between 0.5 to 40 parts by weight, and desirably between 1 to 30 parts by weight, per 100 parts by weight of the polyacetal base resin. When the amount of the graft copolymer component is excessively small, the sliding characteristics, especially anti-frictional noise characteristics, cannot be attained. When the amount of the graft copolymer component is excessively large, however, the mechanical properties (such as rigidity) are deleteriously affected.

The lubricant component which can be used in the compositions of the present invention includes all of the well known lubricants which are liquid at room temperature, or at least liquid at the resin's extrusion temperature. Examples include mineral oils such as spindle oil, refrigerator oil, turbine oil, machine oil, cylinder oil, gear oil and paraffinic oil; hydrocarbons such as liquid paraffin, paraffin wax and polyethylene wax; fatty acids such as lauric acid, myristic acid, palmitic acid, stearic acid, arachidic acid, behenic acid and montanic acid; alcohols such as hexyl alcohol, octyl alcohol, cetyl alcohol, stearyl alcohol, beyhenyl alcohol, glycols, glycerol, polyglycerol and pentaerythritol; fatty acid esters such as those of the above fatty acids with the above alcohols such as stearyl stearate, behenyl behenate, pentaerythritol tristearate, pentaerythritol tetrastearate, glycerol monostearate and glycerol monobehenate; fatty acid amides such as stearamide, palmitiamide, oleamide, methylenebisstearamide and ethylenebisstearamide; metallic soaps such as calcium stearate, zinc stearate and magnesium stearate; natural waxes such as montan wax; and silicone oils.

At least one lubricant (preferably selected from the lubricants noted above) is used. Because of the ease of handling, processability, anti-frictional and abrasive-resistance characteristics, mechanical properties, and the like, paraffinic oils, fatty acids fatty acid esters and silicone oils are most desirable. More particularly, fatty acid esters having a total number of carbon atoms of at least 20, and silicone oils are especially preferred.

The amount of the lubricant component in the compositions of this invention is between 0.1 to 20 parts by weight per 100 parts by weight of the polyacetal base resin. When this amount is less than 0.1 part by weight, no improvements in the slidability properties can be attained. On the other hand, when this amount is larger than 20 parts by weight, the other desirable properties of the polyacetal base resin are usually impaired. Preferably, the lubricant is present in the compositions of the present invention in an amount between 0.5 to 10 parts by weight.

The addition of the graft copolymer and the lubricant to the polyacetal base resin significantly improves the anti-frictional and abrasion-resistance characteristics of polyacetal compositions. However, the surface hardness of molded articles decreases when graft copolymers and lubricants are used as additives for polyacetal resins. As a result, the use of such a combination has limited applicability to special sliding members. In addition, molded articles formed of such a composition tend to be difficult to machine. Furthermore, it was discovered that when a combination of the graft copolymer and relatively large amount of lubricant is added to polyacetal base resin, molded articles tend to delaminate under certain molding conditions.

The compositions of this invention are especially characterized in that an inorganic powder having specific particle diameters are added to the above-described components. In this regard, it has been discovered that four necessary components of the present invention—namely a polyacetal base resin, a graft copolymer, a lubricant, and an inorganic powder—are blended to form a polyacetal resin composition. A sliding member having excellent sliding characteristics, moldability, machinability and other physical properties can thus be obtained when formed of the polyacetal compositions of this invention. The inorganic powder used for this purpose is one having a mean particle diameter of 50 μm or less, and wherein at least 95% of the particles have a particle diameter of 100 μm or less. In this regard, as the particle diameter of the inorganic powder increases, the powder forms irregularities on the surface of molded sliding members thereby increasing the article's surface roughness, which can damage the mating material against which the sliding member slides.

Although the type of inorganic powder used is not particularly limited, specific preferred examples include calcium carbonate, magnesium carbonate, talc, silica, clay, kaolin, diatomaceous earth, pearlite, bentonite, feldspar, carbon and white carbon. It is particularly desirable to use at least one member selected from the group consisting of calcium carbonate, talc, silica, clay, mica and carbon.

The amount of inorganic powder is preferably between 0.5 to 30 parts by weight per 100 parts by weight of the polyacetal base resin. When the amount of inorganic powder is less than 0.5 parts by weight, little (if any) improvements in surface hardness and machinability can be recognized. On the other hand, when it is present in amounts greater than 30 parts by weight, the slidability properties are usually deleteriously affected. In addition, excess inorganic powder in the polyacetal compositions may roughen the surface of molded articles to an undesirable extent as was briefly mentioned above.

The compositions of the present invention are especially characterized in that a polyacetal resin having excellent performance characteristics and balanced properties, including anti-frictional and abrasion-resistance characteristics, moldability, surface properties (hardness and delamination), and machinability can be obtained by adding a combination of a specified graft copolymer with a lubricant and a specified inorganic powder to a polyacetal base resin.

Although the addition of a "rigid" inorganic material usually deleteriously affects sliding characteristics of molded parts, such as anti-friction and abrasion-resistance properties, it has unexpectedly been found that particulate inorganic powders having particle diameters as specified previously (especially fine particulate materials comprising calcium carbonate, talc, silica, clay, mica or carbon) do not deleteriously affect the polyacetal compositions' sliding characteristics.

The compositions of this invention thus exhibit excellent sliding characteristics necessary for use as tape guides used in videotape recorders, for example. In addition, molded parts formed of the compositions of the present invention are easily machined so that specified dimensions and/or specified forms generally required of sliding members can be provided.

Other additives may be incorporated into the compositions of the present invention as may be desired for specific end use applications. Examples of such additives include colorants, mold release agents (other than the above-mentioned lubricants), nucleating agents, antistatic agents, surfactants, and polymers (other than the above-mentioned graft copolymers). It is also possible to add at least one inorganic, organic, metallic or the like fibrous or flaky filler or other particulate fillers in the compositions of the present invention provided that the beneficial characteristics are not deleteriously affected.

The compositions according to the present invention can easily be prepared by known techniques which have been generally used in preparing conventional resin compositions. For example, the ingredients may first be mixed and then kneaded and extruded in a uniaxial or biaxial extruder to prepare pellets. The pellets may then be molded to form molded sliding members. Alternately, pellets having different compositions may be prepared as a master batch with a specific amount of such pellets being mixed with other components and then molded to form sliding members.

In the preparation of the compositions according to the present invention, it is most desirable to improve the dispersability of the additives whereby at least part of the polyacetal base resin is ground into a powder which is then mixed with the other components. The thus obtained mixture may then be extruded to form pellets and/or a final molded article.

When a liquid lubricant is employed, the graft copolymer component is preferably impregnated with the lubricant by premixing. The premixed components may then be kneaded with the polyacetal base resin and extruded. Such premixing is especially desirable in view of the ease with which the compositions of the present invention can be prepared when liquid lubricant components are employed.

The polyacetal resin compositions according to the present invention exhibit excellent sliding characteristics (including anti-friction, anti-frictional noise and abrasion-resistance properties), in addition to significantly improved surface hardness and machinability properties. Moreover, molded sliding members formed of the compositions of the present invention show significantly reduced surface delamination and overall more desirable properties for use as a sliding member. The compositions of the present invention are easily extruded and molded and do not undergo appreciable separation, "bleeding", and the like of the components onto the surface of the resulting molded article.

Further aspects and advantages of the present invention will become apparent from the following non-limiting examples.

EXAMPLES

The data used in the following Examples were obtained using the following techniques:

1. Surface Appearance of a Molding

Test pieces for evaluation (50 mm × 50 mm × 1 mm, centerpin gate system) were molded under the molding conditions identified in Table 1 to evaluate the delamination state on their surfaces (especially, near the gates) using the following qualitative ranks:

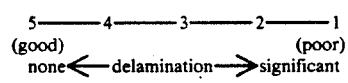

```
5———————4———————3———————2———————1
(good)                              (poor)
none ⇐—delamination—⇒ significant
```

TABLE A

| Molding conditions | A | B |
| --- | --- | --- |
| cylinder temperature (°C.) | 190 | 190 |
| injection pressure (kg/cm²) | 750 | 750 |
| injection speed (m/min) | 1 | 3 |

2. Machinability

A guide roller as shown in FIG. 1 was prepared and aged at 140° C. for 3 hours. An inside sliding part of the roller was machined with a fine lathe turning machine. The appearance (burring and fluffing) of the machine inside surface was then viewed under an electron microscope (×2000) and evaluated using the following ranks:

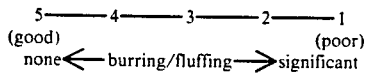

3. Vickers Hardness

The surface of the frictional face of a molding (a cylindrical molding having an inside diameter of 20 mm and an outside diameter of 25.6 mm) for the friction and abrasion test was measured with a microVickers hardness meter (mfd. by Matsuzawa Seiki). The larger numbers indicate a harder molding.

2. Coefficient of Friction and Specific Abrasion Wear

The coefficient of friction and the specific abrasion wear were measured with a Suzuki friction and abrasion tester under a pressure of 0.9 kg/cm$^2$, a linear speed of 180 mm/sec, and a contact area of 2.0 cm$^2$ by using an ordinary polyacetal resin (Duracon ® M 90-02 polyacetal, a product of Polyplastics Co., Ltd.) as the mating member.

The substances used as the component B and the constituents thereof are as follow, and listed in Tables 1 and 2 in terms of abbreviations:

(a) PE: polyethylene
(a) E/GMA: ethylene/glycidyl methacrylate (85:15) copolymer
(b) PMMA: polymethyl methacrylate
(b) AN/S: acrylonitrile/styrene copolymer
(B) PE-g-PMMA: graft copolymer of PE (50) with PMMA (50)
(B) PE-g-AN/S: graft copolymer of PE (50) with AN/S
(B) E/GMA-g-PMMA: graft copolymer of E/GMA (70) with PMMA (30)

Examples 1 to 15 and Comparative Examples 1 to 13

A polyacetal resin Duracon ® polyacetal a product of Polyplastics Co. Ltd. was mixed with a graft copolymer as component (B), a lubricant as component (C) and an inorganic powder as component (D) in the proportions as specified in Table 1. The mixture was melt-kneaded with a twin-screw extruder to give a pelletized composition. A test piece was prepared by injection molding the pellets and evaluated. Table 1 give the results.

For comparison, compositions listed in Table 2, prepared by omitting one or two components from among the graft copolymer (B), lubricant (C) and inorganic powder (D), and a composition formed by using an inorganic powder of a larger particle diameter as component (D), were evaluated in the same manner. The results of such comparisons is given in Table 2.

TABLE 1

| | | Example No. 1 | 2 | 3 | 4 | 5 | 6 | 7 | 8 |
|---|---|---|---|---|---|---|---|---|---|
| (A) | polyacetal resin (pts. wt.) | 100 | 100 | 100 | 100 | 100 | 100 | 100 | 100 |
| (B) | PE-g-PMMA (pts. wt.) | 10 | 10 | 10 | 10 | 10 | 10 | — | — |
| | PE-g-AN/S (pts. wt.) | — | — | — | — | — | — | 5 | 10 |
| | E/GMA-g-PMMA (pts. wt.) | — | — | — | — | — | — | — | — |
| (C) | paraffin oil (pts. wt.) | 1 | 2 | — | — | — | — | — | — |
| | stearyl stearate (pts. wt.) | — | — | 5 | 5 | — | 5 | 2 | 2 |
| | glycerol monobehenate (pts. wt.) | — | — | — | — | 5 | — | — | — |
| | silicone oil (pts. wt.) | — | — | — | — | — | — | — | — |
| (D) | calcium carbonate (mean particle diameter 3 μm)*1 (pts. wt.) | 5 | 5 | 5 | 5 | 5 | 5 | 5 | 5 |
| | calcium carbonate (mean particle diameter 20 μm)*2 (pts. wt.) | — | — | — | — | — | — | — | — |
| | calcium carbonate (mean particle diameter 70 μm)*3 (pts. wt.) | — | — | — | — | — | — | — | — |
| | talc (mean particle diameter 3 μm)*4 (pts. wt.) | — | — | — | — | — | — | — | — |
| | silica (mean particle diameter 2 μm)*5 (pts. wt.) | — | — | — | 5 | — | — | — | — |
| | carbon black (mean particle diameter 30 nm) (pts. wt.) | — | — | — | — | — | — | — | — |
| Evaluation | surface appearance of molding (A) | 5 | 5 | 4 | 5 | 5 | 5 | 5 | 5 |
| | surface appearance of molding (B) | 5 | 5 | 4 | 4 | 5 | 5 | 5 | 5 |
| | machinability | 5 | 5 | 4 | 5 | 5 | 5 | 5 | 5 |
| | Vickers hardness | 16 | 16 | 15 | 19 | 18 | 17 | 18 | 17 |
| | frictional and abrasive characteristics | coefficient of dynamic friction | 0.23 | 0.21 | 0.20 | 0.23 | 0.22 | 0.22 | 0.21 | 0.21 |
| | | specific abrasion wear test material (mm³/kg·km) | 4 × 10⁻² | 2 × 10⁻² | 2 × 10⁻² | 2 × 10⁻² | 3 × 10⁻² | 2 × 10⁻² | 2 × 10⁻² | 2 × 10⁻² |
| | | mating material (mm³/kg·km) | 6 × 10⁻² | 5 × 10⁻² | 4 × 10⁻² | 6 × 10⁻² | 5 × 10⁻² | 4 × 10⁻² | 4 × 10⁻² | 4 × 10⁻² |

| | | Example No. 9 | 10 | 11 | 12 | 13 | 14 | 15 |
|---|---|---|---|---|---|---|---|---|
| (A) | polyacetal resin (pts. wt.) | 100 | 100 | 100 | 100 | 100 | 100 | 100 |
| (B) | PE-g-PMMA (pts. wt.) | 10 | 10 | 10 | 10 | 10 | 10 | — |
| | PE-g-AN/S (pts. wt.) | — | — | — | — | — | — | 10 |
| | E/GMA-g-PMMA (pts. wt.) | — | — | 5 | — | — | — | 2 |
| (C) | paraffin oil (pts. wt.) | — | — | — | — | — | — | — |
| | stearyl stearate (pts. wt.) | 5 | 5 | — | 5 | 5 | 5 | 5 |
| | glycerol monobehenate (pts. wt.) | — | — | — | — | — | — | — |
| | silicone oil (pts. wt.) | — | — | — | — | — | — | — |
| (D) | calcium carbonate (mean particle diameter 3 μm)*1 (pts. wt.) | 5 | 10 | 20 | — | — | — | — |
| | calcium carbonate (mean particle diameter 20 μm)*2 (pts. wt.) | — | — | — | 5 | — | — | — |
| | calcium carbonate (mean particle diameter 70 μm)*3 (pts. wt.) | — | — | — | — | — | — | — |
| | talc (mean particle diameter 3 μm)*4 (pts. wt.) | — | — | — | — | 5 | — | — |
| | silica (mean particle diameter 2 μm)*5 (pts. wt.) | — | — | — | — | — | 5 | 5 |
| | carbon black (mean particle diameter 30 nm) (pts. wt.) | — | — | — | — | — | — | — |
| Evaluation | surface appearance of molding (A) | 5 | 5 | 5 | 5 | 3 | 5 | 5 |
| | surface appearance of molding (B) | 4 | 5 | 5 | 4 | 5 | 4 | 5 |
| | machinability | 5 | 5 | 5 | 5 | 5 | 4 | 5 |
| | Vickers hardness | 16 | 15 | 16 | 16 | 18 | 15 | 16 |
| | frictional and abrasive characteristics | coefficient of dynamic friction | 0.20 | 0.20 | 0.21 | 0.20 | 0.21 | 0.20 | 0.21 |
| | | specific abrasion wear test material (mm³/kg·km) | 2 × 10⁻² | 2 × 10⁻² | 3 × 10⁻² | 3 × 10⁻² | 2 × 10⁻² | 2 × 10⁻² | 3 × 10⁻² |
| | | mating material (mm³/kg·km) | 4 × 10⁻² | 4 × 10⁻² | 5 × 10⁻² | 4 × 10⁻² | 4 × 10⁻² | 3 × 10⁻² | 6 × 10⁻² |

*1 particle diameter ≦ 50 μm: 99% <
*2 particle diameter ≦ 100 μm: 98%; ≦ 50 μm: 95%
*3 particle diameter ≦ 100 μm: 92%
*4 particle diameter ≦ 100 μm: 99% <; ≦ 50 μm: 96%
*5 particle diameter ≦ 100 μm: 99% <; ≦ 50 μm: 97%

TABLE 2

| | | Comparative Example No. 1 | 2 | 3 | 4 | 5 | 6 | 7 |
|---|---|---|---|---|---|---|---|---|
| (A) | polyacetal resin (pts. wt.) | 100 | 100 | 100 | 100 | 100 | 100 | 100 |
| (B) | PE-g-PMMA (pts. wt.) | 10 | 10 | 10 | 10 | — | 10 | 10 |
| | PE-g-AN/S (pts. wt.) | — | — | — | — | — | — | — |
| | E/GMA-g-PMMA (pts. wt.) | — | — | — | — | — | — | — |
| (C) | paraffin oil (pts. wt.) | 1 | 2 | 5 | — | — | — | — |
| | stearyl stearate (pts. wt.) | — | — | — | 5 | 5 | 5 | 5 |
| | glycerol monobehenate (pts. wt.) | — | — | — | — | — | — | — |
| | silicone oil (pts. wt.) | — | — | — | — | — | — | 5 |
| (D) | calcium carbonate (mean particle diameter 3 μm)*1 (pts. wt.) | 5 | 5 | 3 | 4 | 1 | 3 | 4 |
| | calcium carbonate (mean particle diameter 20 μm)*2 (pts. wt.) | 3 | 2 | 1 | 2 | 1 | 1 | 2 |
| | calcium carbonate (mean particle diameter 70 μm)*3 (pts. wt.) | 2 | 1 | 1 | 4 | 5 | 1 | 4 |
| | talc (mean particle diameter 3 μm)*4 (pts. wt.) | — | — | — | — | — | — | — |
| | silica (mean particle diameter 2 μm)*5 (pts. wt.) | — | — | — | — | — | — | — |
| | carbon black (mean particle diameter 30 nm) (pts. wt.) | — | — | — | — | — | — | — |
| Evaluation | surface appearance of molding (A) | | | | | | | |
| | surface appearance of molding (B) | | | | | | | |
| | machinability | | | | | | | |
| | Vickers hardness | 12 | 12 | 11 | 18 | 19 | 11 | 17 |
| | frictional and coefficient of dynamic friction | 0.23 | 0.22 | 0.20 | 0.35 | 0.32 | 0.19 | 0.23 |
| | abrasive specific test material (mm³/kg·km) | $11 \times 10^{-2}$ | $7 \times 10^{-2}$ | $7 \times 10^{-2}$ | $10 \times 10^{-2}$ | $11 \times 10^{-2}$ | $7 \times 10^{-2}$ | $6 \times 10^{-2}$ |
| | characteristics abrasion mating material (mm³/kg·km) | $15 \times 10^{-2}$ | $8 \times 10^{-2}$ | $6 \times 10^{-2}$ | $12 \times 10^{-2}$ | $13 \times 10^{-2}$ | $6 \times 10^{-2}$ | $9 \times 10^{-2}$ |
| | wear | | | | | | | |

| | | Comparative Example No. 8 | 9 | 10 | 11 | 12 | 13 |
|---|---|---|---|---|---|---|---|
| (A) | polyacetal resin (pts. wt.) | 100 | 100 | 100 | 100 | 100 | 100 |
| (B) | PE-g-PMMA (pts. wt.) | — | 10 | — | 10 | 10 | — |
| | PE-g-AN/S (pts. wt.) | 5 | — | 10 | — | — | 10 |
| | E/GMA-g-PMMA (pts. wt.) | — | — | — | — | — | — |
| (C) | paraffin oil (pts. wt.) | 2 | 2 | 5 | — | — | 2 |
| | stearyl stearate (pts. wt.) | — | — | — | 5 | — | — |
| | glycerol monobehenate (pts. wt.) | — | — | — | — | 5 | — |
| | silicone oil (pts. wt.) | — | — | — | — | — | — |
| (D) | calcium carbonate (mean particle diameter 3 μm)*1 (pts. wt.) | 4 | 4 | 4 | 4 | 2 | 4 |
| | calcium carbonate (mean particle diameter 20 μm)*2 (pts. wt.) | 2 | 1 | 1 | 2 | 1 | 1 |
| | calcium carbonate (mean particle diameter 70 μm)*3 (pts. wt.) | 2 | — | — | — | — | 2 |
| | talc (mean particle diameter 3 μm)*4 (pts. wt.) | — | — | — | — | — | — |
| | silica (mean particle diameter 2 μm)*5 (pts. wt.) | — | — | — | — | — | — |
| | carbon black (mean particle diameter 30 nm) (pts. wt.) | — | — | — | — | — | — |
| Evaluation | surface appearance of molding (A) | | | | | | |
| | surface appearance of molding (B) | | | | | | |
| | machinability | | | | | | |
| | Vickers hardness | 13 | 12 | 11 | 11 | 11 | 12 |
| | frictional and coefficient of dynamic friction | 0.22 | 0.21 | 0.20 | 0.20 | 0.19 | 0.21 |
| | abrasive specific test material (mm³/kg·km) | $8 \times 10^{-2}$ | $7 \times 10^{-2}$ | $7 \times 10^{-2}$ | $7 \times 10^{-2}$ | $6 \times 10^{-2}$ | $6 \times 10^{-2}$ |
| | characteristics abrasion mating material (mm³/kg·km) | $9 \times 10^{-2}$ | $7 \times 10^{-2}$ | $6 \times 10^{-2}$ | $6 \times 10^{-2}$ | $6 \times 10^{-2}$ | $6 \times 10^{-2}$ |
| | wear | | | | | | |

*1 particle diameter ≦ 50 μm: 99% <
*2 particle diameter ≦ 100 μm: 98%; ≦ 50 μm: 95%
*3 particle diameter ≦ 100 μm: 92%
*4 particle diameter ≦ 100 μm: 99% <; ≦ 50 μm: 96%
*5 particle diameter ≦ 100 μm: 99% <; ≦ 50 μm: 97%

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

We claim:

1. A polyacetal resin molding composition exhibiting anti-friction and abrasion-resistance properties consisting essentially of:
   (A) 100 parts by weight of a polyacetal base resin;
   (B) between 0.5 to 40 parts by weight of a branched or cross-linked graft copolymer which is at least one copolymer which is the graft-reaction product of polyethylene and polymethyl methacrylate polymers, polyethylene and acrylonitrile/styrene polymers, and ethylene/glycidyl methacrylate and polymethyl methacrylate;
   (C) between 0.1 to 20 parts by weight of a lubricant; and
   (D) between 0.5 to 30 parts by weight of an inorganic rigid powder selected from the group consisting of calcium carbonate, talc, silica, clay, and mica, wherein said powder has a mean particle diameter of 50 μm or less, and wherein at least 95% of the particles have a particle diameter of 100 μm or less.

2. A polyacetal resin composition as in claim 1, wherein the mean particle diameter of the inorganic powder is 10μ or less.

3. A polyacetal resin composition as in claim 1, wherein the lubricant is at least one selected from the group consisting of paraffinic oils, fatty acids and esters of fatty acids, and silicone oils.

4. A molded sliding member consisting essentially of the anti-friction and wear-resistant polyacetal resin composition according to claim 1.

5. A sliding member as in claim 4, wherein the mean particle diameter of the inorganic powder is 10μ or less.

6. A sliding member as in claim 4, wherein the lubricant is at least one selected from the group consisting of paraffinic oils, fatty acids and esters of fatty acids, and silicone oils.

* * * * *

UNITED STATES PATENT AND TRADEMARK OFFICE
CERTIFICATE OF CORRECTION

PATENT NO.   : 5,173,532
DATED        : December 22, 1992
INVENTOR(S) : Endo et al It is certified that error appears in the above-identified patent and that said Letters Patent is hereby corrected as shown below:

Column 4, line 19, after "acids" insert a comma (,);
         line 50, after "diameters" delete "are" and insert --is--.

Column 8, line 20, delete "give" and insert --gives--;
         line 28, after "comparisons" delete "is" and insert --are--.

Signed and Sealed this

Ninth Day of November, 1993

Attest:

BRUCE LEHMAN

*Attesting Officer*     *Commissioner of Patents and Trademarks*